United States Patent [19]
Olson

[11] Patent Number: 5,998,062
[45] Date of Patent: Dec. 7, 1999

[54] BATTERY PASTE COMPOSITIONS AND ELECTROCHEMICAL CELLS FOR USE THEREWITH

[75] Inventor: John B. Olson, Boulder, Colo.

[73] Assignee: Optima Batteries, Inc., Aurora, Colo.

[21] Appl. No.: 09/198,678

[22] Filed: Nov. 23, 1998

Related U.S. Application Data

[63] Continuation of application No. 08/853,377, May 8, 1997, Pat. No. 5,871,862.

[51] Int. Cl.⁶ .............................. H01M 4/62; H01M 4/56
[52] U.S. Cl. ............................ 429/217; 429/225; 141/1.1; 29/623.5
[58] Field of Search ..................................... 429/198, 204, 429/217, 225; 29/623.5; 141/1.1

[56] References Cited

U.S. PATENT DOCUMENTS

| | | | |
|---|---|---|---|
| 3,419,431 | 12/1968 | Michaels | 429/204 X |
| 3,480,478 | 11/1969 | Sohn et al. | 429/225 X |
| 4,232,100 | 11/1980 | Magnusson et al. | 429/217 |
| 4,902,532 | 2/1990 | Seo | 427/58 |
| 5,871,862 | 2/1999 | Olson | 429/217 |

*Primary Examiner*—Stephen Kalafut
*Attorney, Agent, or Firm*—Klaas, Law, O'Meara & Malkin, P.C.; Michael A. Goodwin, Esq.

[57] ABSTRACT

An improved battery paste composition and a lead-acid electrochemical cell which incorporates the composition. The cell includes a positive current collector and a negative current collector which are each coated with a paste containing one or more lead-containing compositions and a paste vehicle to form a positive plate and a negative plate. An absorbent electrolyte-containing separator member may also be positioned between the positive and negative plates. The paste on the positive current collector, the negative current collector, or both further includes a special additive consisting of polyvinylsulfonic acid or salts thereof which provides many benefits including improved battery cycle life, increased charge capacity, and enhanced overall stability. The additive also makes the pastes smoother and more adhesive, thereby improving the paste application process. The paste compositions of interest may be used in conventional flat-plate cells or in spirally wound batteries with equal effectiveness.

19 Claims, 2 Drawing Sheets

FIG. 1

FIG. 2

BATTERY PASTE COMPOSITIONS AND ELECTROCHEMICAL CELLS FOR USE THEREWITH

This application is a continuation of application Ser. No. 08/853,377 filed May 8, 1997, now U.S. Pat. No. 5,871,862, which is hereby incorporated by reference for all that is disclosed therein.

CONTRACTUAL ORIGIN OF THE INVENTION

The Government of the United States of America has rights in this invention pursuant to sub-contract ZCB-4-13032-10 (sub-sub-contract TCB02586) awarded by the U.S. Department of Energy.

FIELD OF THE INVENTION

The present invention generally relates to lead-acid electrochemical cell technology, and more particularly to a specially-formulated paste composition for use in a lead-acid electrochemical cell which provides extended cycle life, increased charge capacity, improved internal stability, and other benefits.

BACKGROUND OF THE INVENTION

Lead-acid electrochemical cells which are otherwise known as "lead-acid batteries" are commonly used to store and deliver electrical energy. For example, lead-acid electrochemical cells are normally employed in vehicles (e.g. cars, trucks, boats, aircraft, and the like) for ignition, lighting, and other related purposes. These applications are typically known as "SLI" or "starting-lighting-ignition" functions. Lead-acid electrochemical cells are also used in "deep cycle" or traction-related applications.

Conventional lead-acid electrochemical cells include electrically-conductive positive and negative current collectors typically manufactured in the form of foraminous (porous) metallic grids which are manufactured from a lead alloy or elemental lead (99.9%–99.99% purity lead [Pb]) as noted in U.S. Pat. No. 3,951,688. The individual current collectors may be planar (flat) in configuration or spirally-wound as discussed further below. Regardless of form, both the positive and negative current collectors (e.g. grids) are supplied with a paste composition that is directly deposited onto both sides of the current collectors during cell production. As a result, positive and negative "plates" are formed from the pasted current collectors. The positive and negative pastes are typically produced from one or more particulate lead-containing compositions which may consist of, for example, finely-divided elemental lead (Pb) or lead compounds (e.g. oxides such as PbO ["litharge"] and/or $Pb_3O_4$ ["red lead"], as well as lead sulfates [$PbSO_4$]). The selected lead-containing compositions are then combined with a paste "vehicle" (e.g. water) and various other optional ingredients including sulfuric acid [$H_2SO_4$]. Other additives of interest comprise expander materials as discussed in U.S. Pat. No. 4,902,532 which include barium sulfate, carbon black, and lignosulfonate. The expander materials are primarily used in connection with the negative paste as discussed further below.

The paste composition positioned on the positive current collector to form the positive plate in an electrochemical cell is typically characterized as the "positive paste", while the paste composition located on the negative current collector to produce the negative plate is known as the "negative paste". Further information regarding these items and other characteristics of battery paste compositions in general are presented in U.S. Pat. No. 4,648,177 which is incorporated herein by reference. Likewise, methods of applying the paste compositions listed above to the positive and negative current collectors are specifically discussed in U.S. Pat. Nos. 3,894,886; 3,951,688 and 4,050,482 which are also incorporated by reference.

From a functional standpoint, the current collecting members not only collect electrical current within the cell, but likewise provide mechanical support for the paste compositions. The paste compositions specifically function as the active electrochemical materials for storing electrical energy. Battery systems of the type listed above are also commonly referred to as "pasted plate" batteries or "Faure-type" batteries. These particular battery systems (as discussed in U.S. Pat. Nos. 3,894,886; 3,951,688; 4,050,482; and 4,902,532) further include a supply of a selected electrolyte composition therein. Electrolyte materials suitable for this purpose are normally acidic in character, with representative electrolyte compositions including but not limited to aqueous solutions of $H_2SO_4$. The electrolyte may also comprise various additives therein such as sodium sulfate [$Na_2SO_4$], phosphoric acid [$H_3PO_4$], and other sulfate salts associated with various counter-ions (e.g. $Li^+$, $K^+$, $NH_4^+$, $Mg^{+2}$, and the like). From an operational standpoint, the electrolyte functions as both an ionic current carrier and an active material in both the positive and negative plates.

The selected electrolyte solution may be used in different ways within a given electrochemical cell. For example, the electrolyte may be present in liquid form wherein the electrolyte is not contained or absorbed in any structures. This type of battery is normally characterized as a "flooded battery" or "free electrolyte battery." Flooded batteries are generally constructed from planar (flat) positive and negative plates which are arranged in a parallel configuration having the electrolyte solution therebetween.

In contrast, another type of electrochemical cell which is conventionally known as a "retained electrolyte battery" involves a system in which the electrolyte solution is absorbed and retained within a separator element positioned between the plates. To effectively retain the electrolyte solution within the separator element, the material used to produce the separator element is porous and absorbent. Representative compositions suitable for this purpose include cellulose materials or, more preferably, a "mat" comprised of ultra-fine glass fibers as discussed further below and described in U.S. Pat. No. 4,637,966. Retained electrolyte batteries may involve plate structures which are planar (flat) in configuration and arranged in a parallel orientation having the electrolyte-containing separator member positioned therebetween. Representative electrochemical cells of this type are discussed in U.S. Pat. Nos. 4,421,832 and 5,120,620 (incorporated by reference). In addition, retained electrolyte batteries may also be produced in a spirally-wound configuration in which the positive and negative plates (e.g. the current collectors having the pastes thereon) are wound together with the electrolyte-containing separator element positioned therebetween. Examples of this particular battery type are presented in U.S. Pat. Nos. 4,064,725; 4,212,179; 4,346,151; 4,383,011; 4,606,982; 4,637,966; 4,648,177; 4,780,379; and 5,091,273 which are likewise incorporated herein by reference. Spirally-constructed batteries offer a high degree of efficiency and capacity in a minimal amount of physical space.

Finally, lead-acid electrochemical cells may also be produced in two additional types, namely, (1) sealed; and (2) unsealed. In an unsealed battery system, the interior of the battery case or housing is open to the ambient (outside) environment. Excessive oxygen generated within this type of cell during, for example, overcharging is able to escape from the case. In a sealed battery unit, the housing is hermetically sealed to prevent any communication between the interior of the housing and the outside environment. As a result, oxygen generated during the charging process is consumed internally within the battery. Sealed batteries are also known as "recombinant" or "starved electrolyte" cells. Representative sealed (recombinant) battery systems are discussed, for example, in U.S. Pat. No. 4,383,011.

Regardless of the particular lead-acid battery under consideration, a number of important operating characteristics and capabilities must be carefully considered during the battery design process. One factor of primary concern is "charge capacity". The term basically involves the amount of electricity (e.g. "charge") that can be stored and delivered by the battery. High charge capacity in an electrochemical cell enables the maximum, long-term delivery of electrical energy. Another important factor involves "cycle life". One "charge cycle" is generally defined as the change in electrochemical state of a battery when it goes from a charged condition to an uncharged (e.g. discharged) state. After a certain number of cycles, the charge capacity of the battery begins to diminish. Finally, the battery reaches a failure point at which it cannot hold and retain a charge, thereby rendering it unusable. It is therefore important for a lead-acid electrochemical cell to have a maximum "cycle life" with this term being defined as the number of cycles which can be experienced by a battery while still maintaining a charge capacity above a useful value typically defined as 50% or 80% of rated capacity.

Battery failure as described above is believed to occur for many different reasons. In flooded electrolyte-type cells, long-term charge cycling typically causes some or all of the paste materials on the plates to separate from the plates and fall to the bottom of the battery case. This process is conventionally known as a "shedding" of the paste. Furthermore, in both flooded and retained electrolyte batteries, charge cycling may cause the paste compositions to chemically deteriorate. This situation contributes to a general decrease in charge capacity leading to eventual failure. Paste deterioration typically occurs for many possible reasons including microscopic morphological changes, formation of inactive lead sulfate, changes in crystalline structure, changes in amorphous character, loss of contact with the current collectors (e.g. grids) and the like. The positive plate in the cell is typically associated with this failure mode.

All of the factors listed above including charge cycle life, charge capacity, and paste stability contribute to the overall effectiveness and useful life of lead-acid electrochemical batteries. These considerations are therefore of primary importance in the development and production of lead-acid energy systems. As discussed further below, the present invention involves a significant advance in battery technology which is characterized by the development of specially-formulated paste compositions that provide improved charge capacity, charge cycle life, paste integrity, and longevity in lead-acid electrochemical cells. Likewise, the pastes of the present invention have a smooth consistency with beneficial rheology characteristics. These features improve the efficiency of the paste application process and also render the pastes more stable during battery operation so that premature paste separation and deterioration is controlled. For these reasons and the other factors discussed below, the present invention represents an important development in the art of electrochemical cell production and design.

SUMMARY OF THE INVENTION

It is an object of the present invention to provide improved battery paste compositions for the production of a high performance lead-acid electrochemical battery.

It is another object of the invention to provide improved battery paste compositions and electrochemical cells for use therewith in which the cells are characterized by a greater degree of charge capacity.

It is another object of the invention to provide improved battery paste compositions and electrochemical cells for use therewith wherein the cells have a prolonged cycle life.

It is another object of the invention to provide improved battery paste compositions and electrochemical cells for use therewith which are both characterized by a greater degree of electrochemical stability compared with prior systems and materials.

It is a further object of the invention to provide improved battery paste compositions and electrochemical cells for use therewith wherein the paste materials and cells are readily manufactured in a highly-efficient manner using mass-production processes.

It is a further object of the invention to provide improved battery paste compositions and electrochemical cells for use therewith in which the completed battery systems which incorporate the claimed paste products are suitable for many different uses including "SLI" ("starting-lighting-ignition") applications, back-up power sources, traction and motive uses, deep cycle applications, and the like.

It is a further object of the invention to provide improved battery paste compositions and electrochemical cells for use therewith in which the deterioration of internal battery components is minimized, thereby resulting in substantially greater longevity.

It is an even further object of the invention to provide improved battery paste compositions and electrochemical cells for use therewith which achieve the foregoing benefits through the use of a unique paste additive described in detail below.

In accordance with the foregoing objects, the present invention involves a unique paste composition having a special additive therein which is used to produce high-efficiency lead-acid electrochemical cells. This additive provides numerous benefits as described above. While the claimed invention shall be discussed below with primary reference to specific battery structures and components, the invention shall not be limited to any particular lead-acid battery systems or internal battery designs. In contrast, the present invention is prospectively applicable to a wide variety of different lead-acid battery types, sizes, and design configurations. Furthermore, unless otherwise indicated below, the claimed battery system and paste compositions shall not be restricted to any particular construction materials, dimensions, and other numerical parameters which may be selected in accordance with the intended use of the battery under consideration and other factors.

A brief overview of the present invention and its main features will now be provided. More specific details will be presented below in the Detailed Description of Preferred Embodiments section. As noted above, the invention basically involves a specialized battery paste composition having many functional benefits. To facilitate a complete understanding of the novel features of the invention, a representative battery system designed to incorporate the claimed paste materials will now be discussed. In accordance with the invention, a lead-acid electrochemical cell is provided which includes an external case or housing. The terms "cell" and "battery" as used herein shall be considered interchangeable and comparable in meaning. Positioned within the housing is at least one electrically-conductive positive current collecting member and at least one electrically-conductive negative current collecting member positioned in a substantially adjacent relationship. Current collecting members suitable for use in the claimed battery may involve many different forms, sizes, and shapes. For example, the positive and negative current collecting members may either be foraminous in construction with one or more openings therethrough (e.g. in the form of "grids") or non-perforated. Further information regarding the construction materials which may be used to produce the positive and negative current collecting members will be provided below. However, representative construction materials suitable for manufacturing the current collecting members include: (1) a selected lead (Pb) alloy containing lead in combination with various other elements including but not limited to calcium (Ca), tin (Sn), silver (Ag), aluminum (Al), and/or antimony (Sb); or (2) elemental lead (Pb) having a purity level of about 99.9%–99.99%, with the use of a lead alloy being generally preferred.

The positive current collecting member (e.g. the positive grid) will further include a positive paste composition positioned thereon which completely covers the positive current collecting member on both sides. The pasted positive current collecting member is designated herein as the "positive plate". Likewise, the negative current collecting member (e.g. the negative grid) will comprise a negative paste composition positioned thereon to form a "negative plate". The functions of these paste materials are discussed above. Both of the pastes include the same basic ingredients, namely, (1) at least one particulate lead-containing composition; and (2) a paste vehicle. Many different materials may be employed in connection with these two ingredients, with the present invention not being restricted to any particular lead-containing compositions and vehicles. For example, the particulate lead-containing composition may involve the following materials: finely-divided elemental Pb, PbO ("litharge" or "massicot"), $Pb_3O_4$ ("red lead"), $PbSO_4$ ("lead sulfate" with the designation "$PbSO_4$" being defined to also include its associated hydrates), and mixtures thereof. Water is the representative and preferred composition that is used as the paste vehicle. Both the positive and negative pastes may also include a number of additional (optional) ingredients. For example, the positive paste, the negative paste, or both pastes may contain $H_2SO_4$ ("sulfuric acid") therein. This material is used when greater paste porosity is desired in, for example, "starting-lighting-ignition" (e.g. "SLI") applications. Further information regarding each of these ingredients, their functional characteristics, other paste components, and specific examples of representative paste formulations will be presented below in the Detailed Description of Preferred Embodiments section.

In addition to the basic ingredients listed above, the positive paste, the negative paste, or both pastes further comprise a unique and functionally-active paste additive which provides numerous benefits in the completed electrochemical cell. This paste additive involves a polymeric composition known as "polyvinylsulfonic acid" or the salts of this material (e.g. "polyvinylsulfonates"). For example, polyvinylsulfonic acid may be chemically characterized in accordance with the following representative formula:

In this formula, x=0.01–1 and n=10–1000 in a preferred and non-limiting embodiment, with the term "polyvinylsulfonic acid" being defined to encompass all of the formulations included within these numerical ranges. Likewise, the salts of polyvinylsulfonic acid (e.g. "polyvinylsulfonates") may be represented by the following formula:

In the above-listed formula, M is an alkali metal or alkaline earth metal counter-ion preferably selected from the group consisting of $Na^+$, $K^+$, $Li^+$, $Ba^{+2}$, $Mg^{+2}$, $Ca^{+2}$, and $Sr^{+2}$. Likewise, as noted above, x=0.01–1 and n=10–1000 in a preferred and non-limiting embodiment, with the term "polyvinylsulfonate" being defined to encompass all of the formulations included within these ranges.

Polyvinylsulfonic acid and polyvinylsulfonates are available from a number of commercial sources (listed below), and are generally classified as "water-soluble ionomers" (e.g. polymers with ionic groups). Likewise, these materials are also broadly characterized as "polyelectrolytes" with an average molecular weight in a non-limiting, representative embodiment of about 500–100,000. As previously noted, polyvinylsulfonic acid and polyvinylsulfonates collectively provide numerous advantages when used in the paste compositions on the positive and/or negative current collecting members (e.g. grids) of an electrochemical cell. These benefits include: (1) the ability of these materials to function as "plasticizers" in which the sulfate groups therein effectively interlink particulate materials (e.g. the lead-containing compositions) in the pastes to produce a more cohesive paste product; (2) an improvement in the overall charge capacity of the battery; (3) an increase in battery cycle life; (4) the production of more homogeneous, smooth, and uniform paste products which improves the overall efficiency of the paste application process; (5) the control of extraneous crystal growth on the plates; and (6) a general improvement in plate performance under normal and adverse (e.g. low temperature) operating conditions. Addition of the foregoing paste additive to one or both of the positive and negative pastes therefore represents a significant advance in lead-acid electrochemical cell technology.

As previously indicated, the present invention shall not be restricted to any particular ingredient proportions in both the positive and negative pastes, with the exact quantities of the paste components being selected in accordance with a number of factors including the intended use of the battery under consideration and other items as determined by preliminary pilot studies. However, a representative positive paste containing the claimed additive which is applied to the positive current collecting member to produce the positive plate will typically contain about 70–95% by weight particulate lead-containing composition, and about 0.001–0.5% by weight of the claimed paste additive (e.g. polyvinylsulfonic acid or a selected salt [polyvinylsulfonate] thereof). An exemplary negative paste containing the above-described additive which is applied to the negative current collecting member to produce the negative plate will typically contain about 70–95% by weight particulate lead-containing composition, and about 0.001–0.5% by weight of the claimed paste additive (e.g. polyvinylsulfonic acid or a selected salt [polyvinylsulfonate] thereof). The paste additive of the present invention may be used in the positive paste, the negative paste, or in both paste compositions as discussed above. However, it is preferred (but not required) that the polyvinylsulfonic acid or polyvinylsulfonate additive be present in at least the positive paste on the positive current collecting member in order to achieve a maximum level of operating efficiency in the completed battery.

To provide adequate background information, the remaining ingredients, components, and materials associated with an exemplary lead-acid electrochemical cell will now be summarized. If a "retained electrolyte" battery is involved as defined above, a separator member will be provided in the battery housing between the pasted positive current collector (e.g. the positive plate) and the pasted negative current collector (e.g. the negative plate). The separator member will be porous and absorbent in character, with many different construction materials being suitable for this purpose. However, in a representative and preferred embodiment, the separator member will be produced from glass fiber materials of different sizes arranged in a non-woven mat-like configuration. The separator member is designed to retain a supply of the selected acidic electrolyte solution therein during battery operation. While the claimed battery shall not be restricted to any particular materials in connection with the electrolyte, a representative and preferred product for this purpose consists of an aqueous sulfuric acid ($H_2SO_4$) solution.

If a flooded electrolyte cell is involved (as previously defined), a separator member will also typically be used between the pasted positive and negative current collecting members (e.g. the positive and negative plates) to prevent shorting of these components. In a preferred embodiment, the separator members in this type of system will be constructed from a plastic or rubber microporous compound known in the art for this purpose. A supply of a liquid electrolyte solution as discussed above will be present in "free" (uncontained) form within the housing and in fluid communication with the positive and negative plates. The paste additive of the present invention is equally effective in both flooded and retained-electrolyte batteries (as well as other equivalent battery systems including those of conventional "tubular" design). In addition, the paste-containing positive and negative current collectors in the battery may be planar (flat) in configuration or spirally-wound with the separator member(s) positioned therebetween as described below. Both of these designs will benefit from the claimed polyvinylsulfonic acid or polyvinylsulfonate paste additive.

Conventional production methods may be used to assemble the electrochemical cell which contains the paste additive described above. Specific information involving the battery production and assembly process will be presented in the Detailed Description of Preferred Embodiments section. However, to generally produce an electrochemical cell in accordance with the present invention, an electrically-conductive positive current collecting member and an electrically-conductive negative current collecting member of the types listed above are initially provided. The current collecting members may be perforated (e.g. in grid form) or non-perforated as desired. Using conventional paste application techniques as discussed in, for example, U.S. Pat. Nos. 3,894,886; 3,951,688; and 4,050,482 (which are incorporated herein by reference), a positive paste is applied to the positive current collecting member so that the positive paste is positioned thereon. The paste-containing positive current collecting member shall likewise be designated herein as the "positive plate". The positive paste will involve the same ingredients and proportions described above, and will basically include at least one particulate lead-containing composition and a paste vehicle. Likewise, the positive paste will contain the claimed polyvinylsulfonic acid or polyvinylsulfonate paste additive in a preferred embodiment. The positive paste may also include $H_2SO_4$ therein if needed or desired as previously discussed.

A negative paste is then applied to the negative current collecting member using the processing techniques listed above so that the negative paste is positioned thereon. The paste-containing negative current collecting member shall likewise be designated herein as the "negative plate". The negative paste will involve the same ingredients and proportions described above, and will basically include at least one particulate lead-containing composition and a paste vehicle. Likewise, the negative paste will contain the claimed polyvinylsulfonic acid or polyvinylsulfonate paste additive in a preferred and non-limiting embodiment. The negative paste may also include $H_2SO_4$ therein if needed or desired. If the negative paste does, in fact, include the paste additive of the present invention, this additive may also be present in the positive paste (as noted above) or absent from the positive paste as determined by preliminary testing and other factors.

After the paste application process is completed, both of the pasted positive and negative current collecting members (e.g. the positive and negative plates) are positioned within a selected battery (cell) housing. As previously noted, a separator member of the type listed above will typically be positioned between the pasted positive and negative current collecting members prior to or after placement thereof in the housing. Thereafter, a supply of a selected electrolyte solution is delivered to the housing. In a retained electrolyte battery, the electrolyte solution will be absorbed and retained within the porous matrix of the separator member. In a flooded electrolyte system, the electrolyte solution will remain in a freely-flowing state within the housing and in fluid communication (contact) with the positive and negative plates.

Finally, in the basic method described above, the paste-containing positive and negative current collecting members may be substantially planar (e.g. flat) or spirally-wound to form a cylindrical cell structure as previously discussed. Both designs (as well as other configurations including conventional "tubular" batteries) will equally benefit from the claimed paste additive when used in the positive paste, the negative paste, or in both pastes. Accordingly, the present invention again represents a significant advance in the art of lead-acid electrochemical cell technology.

DETAILED DESCRIPTION OF PREFERRED EMBODIMENTS

The present invention involves a specialized battery paste formulation which provides numerous important benefits including improved charge capacity and increased cycle life. The claimed invention shall not be restricted to any particular type of lead-acid electrochemical cell and is applicable to a wide variety of different battery types ranging from flat-plate systems to spirally-wound retained electrolyte batteries. Accordingly, the invention is prospectively applicable to any battery system which incorporates lead-based positive and negative plates in fluid communication with an acidic electrolyte solution. While representative battery systems designed to use the claimed paste formulations will be discussed below, these batteries are presented for example purposes only and shall not limit the invention in any manner.

A. Representative Battery Units

Figure 1:
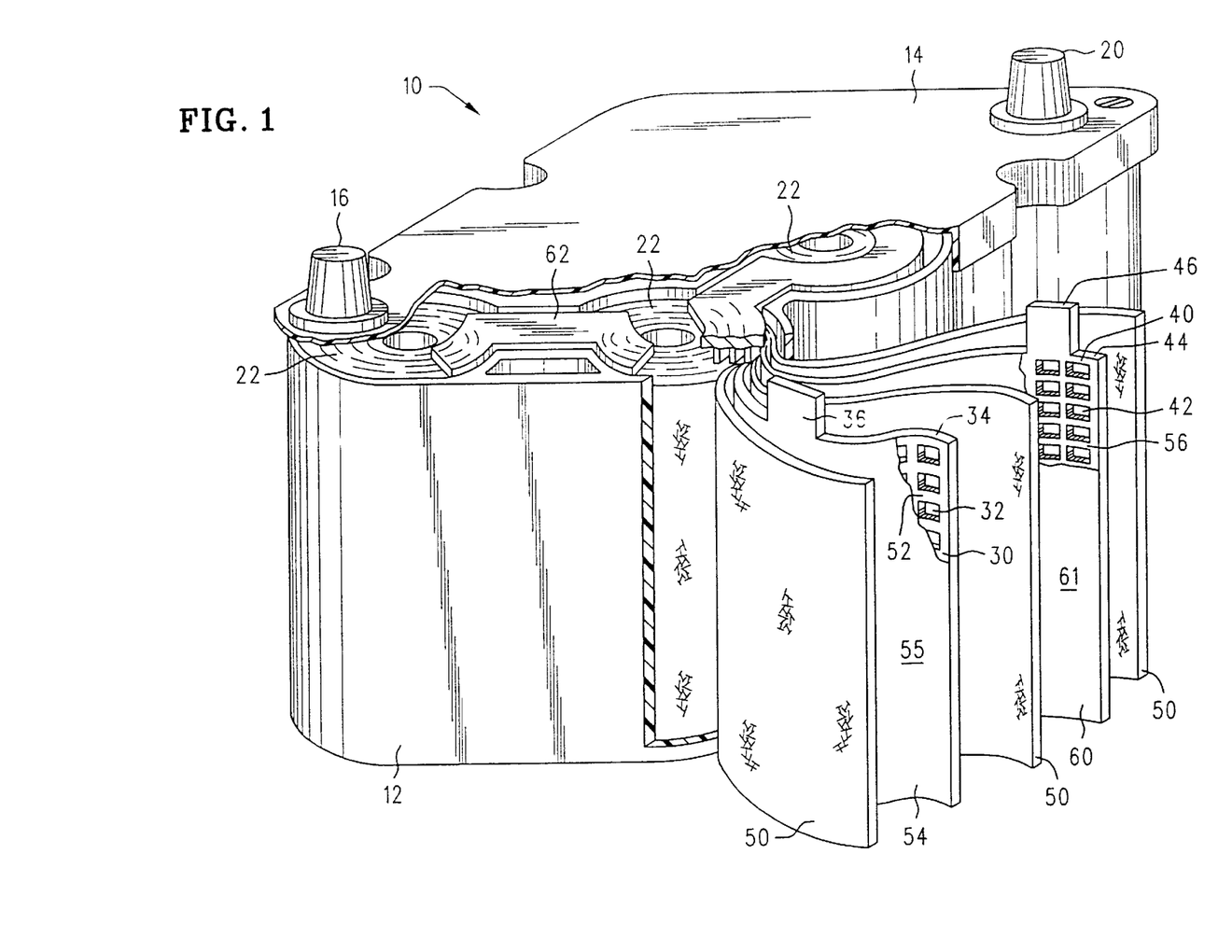
FIG. 1 is a schematic view of a representative retained electrolyte lead-acid battery containing multiple spirally-wound cells which may used in accordance with the materials and processes of the present invention.

As noted above, the invention basically involves a specialized battery paste composition having many functional benefits. To facilitate a complete understanding of the novel features of the invention, a representative battery system designed to incorporate the claimed paste materials will now be discussed. With reference to FIG. 1, an exemplary lead-acid electrochemical battery is schematically illustrated at reference number 10. This battery 10 is discussed in depth in U.S. Pat. No. 4,780,379 which is incorporated herein by reference. The battery 10 first includes a cell housing 12 produced of, for example, an inert plastic selected from the group consisting of polypropylene, polycarbonate, polystyrene, and other similar compositions. The battery 10 is sealed in the embodiment of FIG. 1 using a lid 14 preferably produced from the same materials which are employed to manufacture the housing 12. Sealing of the battery 10 using the lid 14 produces a gas and electrolyte-tight structure of the "starved" variety as discussed above. Extending entirely through the lid 14 are conductive positive and negative terminals 16, 20 shown in FIG. 1 which will be described in further detail below.

As illustrated in FIG. 1, the battery 10 includes six individual cells 22 of identical construction which electrically communicate with each other to form an integral structure that is typically capable of providing 12 volts of electricity for a variety of functions including "SLI" ("starting-lighting-ignition") applications in motor vehicles and "deep cycle" or "traction" uses. A representative cell 22 and its relationship to the present invention will now be described. With continued reference to FIG. 1, each cell 22 includes a number of internal components that are spirally-wound to produce a cylindrical structure of compact design. These components first include a positive current collecting member designated in FIG. 1 at reference number 30. The positive current collecting member 30 is flexible, thin (e.g. having an average thickness of about 0.1–4.0 mm) and preferably foraminous with a plurality of rectangular openings 32 therethrough which form a structure conventionally designated as a "grid". Approximately 2–30 openings 32 per $in^2$ of the positive current collecting member 30 are employed, with each opening 32 having an average (non-limiting) length of about 3–30 mm and a width of about 1–10 mm. In a representative embodiment, the positive current collecting member 30 in each cell 22 may be produced from (1) a selected lead (Pb) alloy containing lead in combination with various other elements including but not limited to calcium (Ca), tin (Sn), silver (Ag), aluminum (Al), and/or antimony (Sb); or (2) elemental lead (Pb) having a purity level of about 99.9%–99.99%, with the use of a lead alloy being preferred in most applications. If a lead alloy is used to produce the positive current collecting member 30, optimum results will be achieved if the other materials in combination with the lead do not exceed about 5% by weight. The term "lead-containing" as used in connection with the positive current collecting member 30 is therefore defined to encompass both lead alloys and substantially pure (e.g. 99.9–99.99% by weight) elemental lead with the selection of either composition being determined in accordance with routine preliminary testing.

Each positive current collecting member 30 further includes an upper longitudinal edge 34 having at least one tab member 36 integrally formed thereon, the function of which will be discussed below. Additional information regarding the content, structure, and general characteristics of the positive current collecting member 30 is presented in U.S. Pat. Nos. 3,951,688; 4,780,379; and 5,120,620 which are incorporated herein by reference. Likewise, the term "current collecting member" as used herein shall encompass a variety of structures with different shapes and sizes ranging from the flexible, elongate grid-type current collecting member 30 illustrated in FIG. 1 to substantially flat, non-perforated panel units, rod-like structures, screen-like materials, tubular elements, and other equivalent components which function as positive current collectors in the battery under consideration.

Also included within each cell 22 is a negative current collecting member 40 illustrated in FIG. 1. To provide a complete understanding of the battery 10 and the paste compositions of the present invention, a detailed discussion of the negative current collecting member 40 will now be provided. The negative current collecting member 40 is flexible, thin (e.g. having an average thickness of about 0.1–4.0 mm), and foraminous with a plurality of rectangular openings 42 therethrough which again form a structure conventionally designated as a "grid". Approximately 2–30 openings 42 per $in^2$ of the negative current collecting member 40 are employed, with each opening 42 having an average (non-limiting) length of about 3–30 mm and a width of about 1–10 mm. In a representative embodiment, the negative current collecting member 40 in each cell 22 may be produced from (1) a selected lead (Pb) alloy containing lead in combination with various other elements including but not limited to calcium (Ca), tin (Sn), silver (Ag), aluminum (Al), and/or antimony (Sb); or (2) elemental lead (Pb) having a purity level of about 99.9%–99.99%, with the use of a lead alloy being preferred in most applications. If a lead alloy is used to produce the negative current collecting member 40, optimum results will be achieved if the other materials in combination with the lead do not exceed about 5% by weight. The term "lead-containing" as used in connection with the negative current collecting member 40 is therefore defined to encompass both lead alloys and substantially pure (e.g. 99.9–99.99% by weight) elemental lead with the selection of either composition being determined in accordance with routine preliminary investigations.

Each negative current collecting member 40 further includes an upper longitudinal edge 44 having at least one tab member 46 integrally formed thereon, the function of which will be discussed further below. Further information concerning the content, structure, and characteristics of the negative current collecting member 40 is again presented in U.S. Pat. Nos. 3,951,688; 4,780,379; and 5,120,620. The term "current collecting member" as used herein shall likewise encompass a variety of structures with different shapes and sizes ranging from the flexible, elongate grid-type current collecting member 40 illustrated in FIG. 1 to substantially flat, non-perforated panel units, rod-like structures, screen-like materials, tubular elements, and other equivalent components which function as positive current collectors in the battery under consideration. The versatility of the present invention will become readily apparent from the additional information provided below.

Positioned between the positive current collecting member 30 and the negative current collecting member 40 (which are both coated with a selected battery paste composition as discussed in detail below) is a separator member 50 which is flexible, thin (e.g. having a representative thickness of about 0.1–8.0 mm), porous, and absorbent. While one separator member 50 is illustrated in FIG. 1, the present invention is equally applicable to battery systems which employ multiple separator layers between the pasted positive and negative current collecting members 30, 40. Many different construction materials may be employed in connection with the separator member 50 including but not limited to cellulose-based compositions and, more preferably, mixtures of fine glass fibers in a non-woven mat-like configuration. Various grades and sizes of glass fibers may be used to form a porous matrix within the separator member 50 so that an optimum level of surface area and absorptivity can be achieved. For example, in an exemplary embodiment, each of the glass fibers in the separator member 50 will have a diameter of about 0.5–10 microns, with mixtures of different-sized fibers within the above-listed size range also being suitable for use in the separator member 50. Representative separators and materials associated therewith are discussed in U.S. Pat. Nos. 4,383,011; 4,414,295; and 4,780,379 which are likewise incorporated herein by reference as noted above. The separator member 50 (which is spirally-wound adjacent to and between the pasted positive and negative current collecting members 30, 40 or "plates" and shown in FIG. 1) is designed to retain a selected electrolyte solution therein as discussed further below. For this reason, is it desired that the separator member 50 be as absorbent (and inert) as possible which is readily accomplished using a glass-fiber system.

Absorbed and retained within the porous matrix of the separator member 50 is a liquid electrolyte (not visible in FIG. 1) which preferably involves at least one solution of a selected acid. In a representative and preferred embodiment, an aqueous sulfuric acid ($H_2SO_4$) solution (4–7 M) is employed for this purpose which is entirely absorbed within the porous matrix of the separator member 50. In the battery 10 of FIG. 1, there is no free-flowing electrolyte inside the housing 12. However, in a non-limiting example, about 8–15 g of 4–7 M $H_2SO_4$ electrolyte solution are used (e.g. retained within the separator member 50) per ampere-hour [Ah] capacity of the battery 10. This amount and the other parameters associated with the electrolyte may be varied as needed in accordance with numerous factors including the specific type of battery under consideration, as well as the other components and materials used in the battery. Further information involving the electrolyte solution which may be employed within the separator member 50 of the battery 10 is provided in U.S. Pat. No. 4,637,966 (also incorporated by reference.)

Each of the positive and negative current collecting members 30, 40 in the battery 10 is coated with a selected battery paste composition as noted above. With continued reference to FIG. 1, the outer surface 52 of the positive current collecting member 30 is completely coated on both sides with a positive paste 54 to produce a pasted structure conventionally designated as a "positive plate" shown in FIG. 1 at reference number 55. Not only does the positive paste 54 entirely cover the outer surface 52 of the positive current collecting member 30 on both sides, but it likewise fills each of the openings 32 within the grid-like structure of the current collecting member 30. In a preferred and non-limiting embodiment, the positive paste 54 is present on the positive current collecting member 30 in an amount equal to about 8–25 g of positive paste 54 per ampere-hour capacity of the battery 10 (which is a conventional and established approach for designating paste quantity). Further detailed information regarding the specific materials used to produce the positive paste 54 (and the relative amounts of these materials) is provided in the next section. The unique paste additive associated with the invention and its important functional attributes will also be discussed below.

In a similar manner, the outer surface 56 of the negative current collecting member 40 is completely coated on both sides with a negative paste 60 to produce a pasted structure conventionally designated as a "negative plate" shown in FIG. 1 at reference number 61. Not only does the negative paste 60 entirely cover the outer surface 56 of the negative current collecting member 40 on both sides, but it likewise fills each of the openings 42 within the grid-like structure of the negative current collecting member 40. In a preferred and non-limiting embodiment, the negative paste 60 is present on the negative current collecting member 40 in an amount equal to about 8–25 g of negative paste 60 per ampere-hour capacity of the battery 10 (which is again a conventional and established approach for designating paste quantity). Further information regarding the specific materials which are used to produce the negative paste 60 will likewise be provided in the next section, along with a detailed discussion of the specialized paste additive of the present invention.

Finally, all of the individual cells 22 in the battery 10 are electrically connected to form a complete electrical pathway through each of the cells 22 as specifically discussed in U.S. Pat. No. 4,780,379 and shown in FIG. 1. A plurality of circuit connector straps 62 are provided for this purpose. The circuit connector straps 62 are conductive in nature and optimally made from a lead alloy composition known in the art for this purpose. Each connector strap 62 is physically attached by conventional means to: (1) the tab member(s) 36 associated with the positive current collecting member 30 in one cell 22; and (2) the tab member(s) 46 associated with the negative current collecting member 40 in the next adjacent cell 22 as illustrated in FIG. 1. One connector strap 62 is used to link (e.g. electrically connect) each two adjacent cells 22 together. Use of the circuit connecting straps 62 enables all of the individual cells 22 to electrically communicate with each other. The electrical pathway formed by the connecting straps 62 terminates at the positive terminal 16 and the negative terminal 20 of the battery 10. Specifically, the positive terminal 16 is operatively attached by known and established resistance welding processes to the tab member(s) 36 associated with the positive current collecting member 30 in the cell 22 directly beneath the positive terminal 16 as shown and discussed in U.S. Patent No. 4,780,379. Likewise, the negative terminal 20 is operatively connected by known and established resistance welding processes to the tab member(s) 46 associated with the negative current collecting member 40 in the cell 22 directly beneath the negative terminal 20. In this manner, an electrical pathway through all of the cells 22 in the battery 10 is completed which terminates at the positive and negative terminals 16, 20. After addition of the electrolyte solution to the battery 10 as previously discussed and attachment of the lid 14 to the housing 12 (e.g. using conventional thermal welding and/or adhesive affixation processes), physical assembly of the battery 10 is completed. The final step in producing the battery 10 involves a process known as "formation" in which an initial charge is applied to the battery 10.

Production of the battery 10 (and all other lead-acid electrochemical cells encompassed within the present invention) may be achieved using many different steps and techniques, with the claimed invention not being restricted to any manufacturing processes for this purpose. However, to produce the battery 10 illustrated in FIG. 1, electrically-conductive positive and negative current collecting members 30, 40 of the types listed above are initially provided. Using conventional paste application techniques discussed in, for example, U.S. Patent Nos. 3,894,886; 3,951,688; and 4,050,482 (incorporated herein by reference), the positive paste 54 is applied to the positive current collecting member 30 on both sides thereof (and within the openings 32). In a similar manner, the negative paste 60 is applied to the negative current collecting member 40 on both sides thereof (and within the openings 42). Application of the positive and negative pastes 54, 60 may again be accomplished using many different techniques including those listed above which employ removable or non-removable backing layers (e.g. pasting papers) that are positioned on the current collecting members 30, 40 prior to final battery assembly to ensure paste integrity. The present invention is therefore applicable to any pasting method of conventional character and shall not be limited in this respect. Regarding the specific pasting methods outlined above, U.S. Pat. No. 3,894,886 basically involves a nozzle-type paste delivery system associated with an apparatus having a plurality of paste-press rolls which uniformly supply the paste materials to the electrode plates. U.S. Pat. No. 4,050,482 uses a similar system which incorporates an extrusion-type bifurcated nozzle assembly. U.S. Pat. No. 3,951,688 also discloses a paste delivery apparatus which includes a nozzle assembly in a compressive roller unit.

Once the positive and negative current collecting members 30, 40 are pasted in order to form the positive plate 55 and the negative plate 61, they are subsequently placed within the housing 12. However, before this step takes place in the retained electrolyte battery 10 of FIG. 1, the pasted current collecting members 30, 40 (e.g. plates 55, 61) are spirally-wound in an adjacent relationship with the separator member 50 therebetween. A representative winding and assembly method suitable for use in producing the battery 10 is discussed in detail in U.S. Pat. No. 4,064,725. This patent discloses a dual-head, belt-driven winder unit designed to manufacture spirally-wound cells of the type discussed herein. Additional assembly methods are also outlined in U.S. Pat. Nos. 4,212,179; 4,648,177; and 5,091,273. U.S. Pat. No. 4,212,179 is of particular interest in that it describes a mandrel apparatus and associated components which may be employed in producing each spirally-wound cell 22. All of the above references are again incorporated herein by reference.

Once the individual cells 22 are assembled, they are positioned within the housing 12, followed by (1) connection of the electrical connecting straps 62 to and between the cells 22; and (2) electrolyte addition (which is retained within the separator member 50). However, the present invention shall not be restricted to any particular order in which these steps are taken which may be varied in accordance with a variety of factors including the production equipment being employed and the type of battery under consideration. The lid 14 is then fixedly secured to the housing 12 followed by "formation" as discussed above. At this point, it is important to emphasize that the present invention (which involves the use of a specialized paste formulation to achieve improved charge efficiency, prolonged cycle life, and other benefits) does not require the use of any special production techniques provided that the claimed pastes are generally applied to the current collectors in a complete and effective manner, following by placement of the finished plates in the cell housing.

Figure 2:
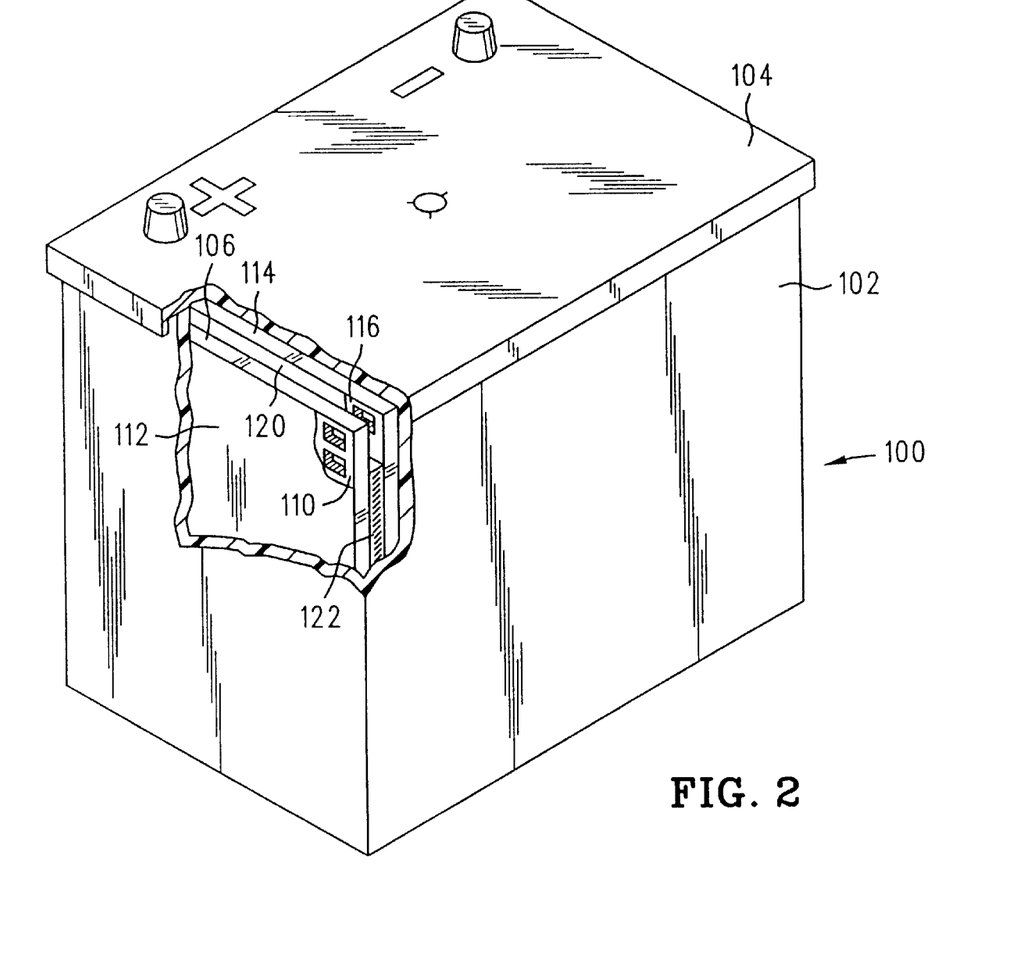
FIG. 2 is a schematic view of a representative parallel plate lead-acid battery which may also be used in accordance with the materials and processes of the invention.

As previously indicated, the present invention shall not be limited to any type of lead-acid electrochemical cell. For example, both flooded electrolyte and retained electrolyte cells may be employed with equal effectiveness. The selected battery system may include plates that are either spirally-wound as shown in FIG. 1 or planar (e.g. flat). Representative flat plate batteries which are suitable for use in connection with the paste compositions of the invention (discussed below) are disclosed in U.S. Pat. Nos. 4,421,832 and 5,120,620 which are incorporated by reference. Likewise, the paste compositions are also applicable to "tubular" battery systems shown and described in U.S. Pat. No. 4,315,829 (also incorporated by reference). Illustrated in schematic form in FIG. 2 for background information purposes is a representative flat-plate battery 100 of the type disclosed in U.S. Pat. No. 5,120,620. With continued reference to FIG. 2, the battery 100 includes a cell housing 102, lid 104, and a plurality of positive plates 106 each consisting of a conductive lead-based positive current collecting member 110 in the form of a grid having a positive paste 112 thereon. The battery 100 also comprises a plurality of negative plates 114 each consisting of a conductive lead-based negative current collecting member 116 in the form of a grid having a negative paste 120 thereon. The positive paste 112, the negative paste 120, or both pastes 112, 120 will contain the specialized paste additive of the present invention as discussed in the next section.

Positioned between the positive and negative plates 106, 114 is at least one separator member 122. In a retained electrolyte-type battery system, the separator member 122 will be of a porous and absorbent nature as discussed in U.S. Pat. No. 5,120,620 (e.g. typically constructed from the materials listed above including glass fiber compositions). In a flooded-type battery system, the separator member 122 will typically be produced from a plastic or rubber microporous compound known in the art for this purpose. Regardless of the particular type and configuration associated with the battery 100, an $H_2SO_4$ electrolyte solution (not shown) of the same type previously discussed in connection with the battery 10 is provided between the plates 106, 114 (either absorbed within the separator member 122 in a retained electrolyte system or in free-flowing, unabsorbed form in a flooded system). Again, the present invention is applicable to a wide variety of lead-acid battery systems with the representative flat-plate battery 100 of FIG. 2 being described herein for example purposes and to support the applicability of the invention to any lead-acid battery system.

B. The Paste Compositions of the Present Invention

The paste compositions of the present invention (and the unique chemical additive associated therewith) will now be described. While this description shall be provided with primary reference to the battery 10 illustrated in FIG. 1, the claimed paste additive is equally applicable to the other types of battery systems previously discussed including the battery 100 shown in FIG. 2, as well as tubular and other battery designs.

With continued reference to FIG. 1, the battery 10 includes a positive paste 54 on the positive current collecting member 30 (which forms the completed positive plate 55) and a negative paste on the negative current collecting member 40 (which forms the completed negative plate 61). In accordance with the present invention, at least one of the claimed paste compositions (e.g. the positive paste 54, the negative paste 60, or both pastes 54, 60) will contain a specialized paste additive which provides many important functional benefits. While it is preferred that, at a minimum, the paste additive be present in the positive paste 54, the invention shall not be limited to this particular embodiment or any variations thereof.

The positive paste 54 includes two basic ingredients (whether or not the specialized paste additive is employed).

These ingredients involve (1) at least one particulate lead-containing composition; and (2) a paste vehicle. Many different materials may be used in connection with the lead-containing composition (which may also be designed as the "first" lead-containing composition), with the present invention not being restricted to any particular materials or mixtures for this purpose. The selected lead-containing composition or compositions will typically have a particle size of about 0.1–10 microns in a representative and non-limiting embodiment. Exemplary lead-containing compositions which may be employed in the positive paste 54 include but are not limited to finely-divided elemental Pb, PbO ("litharge" or "massicot"), $Pb_3O_4$ ("red lead"), $PbSO_4$ ("lead sulfate" with the term "$PbSO_4$" being defined to also include its associated hydrates), and mixtures thereof. These materials may be employed alone or in combination as determined by numerous factors including the intended use of the battery 10 and the other materials employed in the battery 10. Accordingly, the term "lead-containing composition" shall be defined to encompass both elemental lead, lead compounds, and mixtures thereof. Further information regarding lead-containing compositions suitable for use in the positive paste 54 is recited in U.S. Pat. No. 4,648,177 which is incorporated herein by reference. For example, U.S. Patent No. 4,648,177 discloses a positive paste containing about 75% by weight PbO and about 25% by weight $Pb_3O_4$. However, the present invention shall not be restricted to these numerical values or any particular amounts and combinations of ingredients unless otherwise noted herein.

Next, the positive paste 54 includes a paste vehicle which is primarily used as a carrier medium to produce the completed paste 54. Water is a representative and preferred material suitable for use as the paste vehicle. Further information regarding representative amounts of the paste vehicle to be employed in the claimed invention will be discussed below although, from a general standpoint, a representative positive paste 54 will typically include about 3–25% by weight vehicle therein.

In addition, the positive paste 54 may likewise contain an aqueous solution of $H_2SO_4$ therein (e.g. about 0.01–18 M) as an optional ingredient if needed as determined by preliminary pilot testing on the paste compositions and formulations under consideration. The $H_2SO_4$ will be used in situations where greater paste porosity is desired in, for example, "starting-lighting-ignition" (e.g. "SLI") applications. However, the present invention shall not be restricted to the use of $H_2SO_4$ in the positive paste 54 or any particular amounts/concentrations of this material.

As previously indicated, the present invention involves the use of a specialized paste additive in at least one of the positive paste 54, the negative paste 60, or both pastes 54, 60. Optimally (but not necessarily), the additive will be present in at least the positive paste 54. This additive provides many important benefits in the completed battery 10, and involves a polymeric composition known as "polyvinylsulfonic acid" or the salts of this material (e.g. "polyvinylsulfonates"). For example, polyvinylsulfonic acid may be chemically characterized in accordance with the following representative formula:

$(CH_2CH[SO_3H]_xH_{1-x})_n$

In this formula, x=0.01–1 and n=10–1000 in a preferred and non-limiting embodiment, with the term "polyvinylsulfonic acid" being defined to encompass all of the formulations included within these ranges. Likewise, the salts of polyvinylsulfonic acid (e.g. "polyvinylsulfonates") may be represented by the following formula:

$(CH_2CH[SO_3M]_xH_{1-x})_n$

In the above-listed formula, M is a alkali metal or alkaline earth metal counter-ion preferably selected from the group consisting of $Na^+$, $K^+$, $Li^+$, $Ba^{+2}$, $Mg^{+2}$, $Ca^{+2}$, and $Sr^{+2}$. Likewise, as noted above, x=0.01–1 and n=10–1000 in a preferred and non-limiting embodiment, with the term "polyvinylsulfonate" being defined to encompass all of the formulations included within these ranges.

Polyvinylsulfonic acid and polyvinylsulfonates are available from a number of commercial sources (listed below), and are generally classified as "water-soluble ionomers" (e.g. polymers with ionic groups). Likewise, these materials are also broadly characterized as "polyelectrolytes" with an average molecular weight in a non-limiting, representative embodiment of about 500–100,000. As previously noted, polyvinylsulfonic acid and polyvinylsulfonates collectively provide numerous advantages when used in the paste compositions on the positive and/or negative current collecting members (e.g. grids) of an electrochemical cell. These benefits include: (1) the ability of these materials to function as "plasticizers" in which the sulfate groups therein effectively interlink particulate materials (e.g. the lead-containing compositions) in the pastes to produce a more cohesive paste product; (2) an improvement in the overall charge capacity of the battery; (3) an increase in battery cycle life; (4) the production of more homogeneous, smooth, and uniform paste products which improves the overall efficiency of the paste application process; (5) the control of extraneous crystal growth on the plates; and (6) a general improvement in plate performance under normal and adverse (e.g. low temperature) operating conditions. Polyvinylsulfonic acid and salts thereof (polyvinylsulfonates) are commercially available from many sources including but not limited to the Hoechst Company of Germany, Air Products Company of Allentown, Pa. (USA) and Nalco/Exxon of England (UK).

While the exact technical basis for the benefits provided by polyvinylsulfonic acid/polyvinylsulfonates in the positive paste 54 is not completely understood, it is believed that some or all of these benefits result from (A) the presence of sulfate ions in the claimed additive compositions; and (B) the high-molecular-weight polymeric character of polyvinylsulfonic acid/polyvinylsulfonates, with these materials being inherently stable. For example, the additive again functions as a "plasticizer" in the positive paste 54. As noted above, the sulfate groups therein effectively interlink particulate materials (e.g. the lead-containing compositions) in the paste 54 to produce a more cohesive paste product. Sulfate groups in the polyvinylsulfonic acid/polyvinylsulfonate additive also appear to function as "substitutes" for sulfate groups in $H_2SO_4$ electrolyte materials. This substitution capability provides additional increases in battery capacity. Furthermore, the claimed additive is substantially immobile within the positive paste 54 and may also function as a "crystal growth modifier" during charging and discharging of the battery 10. During the operation of battery 10 (and other types of lead-acid electrochemical cells), large crystals primarily comprised of lead sulfate may form on the positive plate 55. The formation of large lead sulfate crystals as described above is detrimental because they resist charging. The use of polyvinylsulfonic acid/polyvinylsulfonates in the positive paste 54 controls the growth of large lead sulfate crystals and instead allows the creation of smaller crystals which do not become inactive.

Finally, use of the claimed additive in the positive paste 54 generally improves the consistency of the paste 54 as noted above. When added to the positive paste 54, the additive functions as a "rheology modifier" which makes the paste 54 smoother and more adhesive, thereby facilitating the paste application process.

The completed positive paste 54 will have a typical density of about 3–5 g/cc. A preferred positive paste 54 containing the desired additive composition is summarized below in Table I:

TABLE I

| Ingredient | Amount (% by weight) |
| --- | --- |
| Particulate lead-containing composition (e.g. $Pb_3O_4$) | about 70–95 |
| Paste additive (e.g. polyvinylsulfonic acid or a selected polyvinylsulfonate) | about 0.001–0.5 |
| Acid composition (e.g. $H_2SO_4$) | about 0–5 |
| Paste vehicle (e.g. water) | balance (amount needed to make 100%) 100% |

The information in Table I is presented for example purposes only and shall not limit the invention in any respect. Even though it is preferred that the claimed additive (which involves polyvinylsulfonic acid or a salt thereof) be used in the positive paste 54, it can be absent from the positive paste 54 but present in the negative paste 60 in an alternative embodiment discussed below. In such a situation, the positive paste 54 without the additive will have the following representative composition values: (1) Particulate lead-containing composition: about 70–95% by weight; (2) $H_2SO_4$: about 0–5% by weight; and (3) Paste vehicle (water): balance needed to make 100%.

The negative paste 60 will, in a preferred embodiment, be substantially similar to the positive paste 54 with certain exceptions as outlined below. To provide a clear and comprehensive disclosure of the invention, specific information involving the negative paste 60 will now be presented. The negative paste 60 also includes two basic ingredients therein. These ingredients involve (1) at least one particulate lead-containing composition; and (2) a paste vehicle. Many different materials may be used in connection with the lead-containing composition (which may also be designated as the "second" lead-containing composition), with the present invention not being restricted to any particular materials or mixtures for this purpose. The selected lead-containing composition or compositions will typically have a particle size of about 0.1–10 microns in a representative and non-limiting embodiment. Exemplary lead-containing compositions which may be employed in the negative paste 60 include but are not limited to finely-divided elemental Pb, PbO ("litharge" or "massicot"), $Pb_3O_4$ ("red lead"), $PbSO_4$ ("lead sulfate" with the term "$PbSO_4$" being defined to also include its associated hydrates), and mixtures thereof. These materials may be employed alone or in combination as determined by numerous factors including the intended use of the battery 10 and the other materials employed in the battery 10. Accordingly, the term "lead-containing composition" shall be defined to encompass both elemental lead, lead compounds, and mixtures thereof. Further information regarding lead-containing compositions suitable for use in the negative paste 60 is recited in U.S. Pat. No. 4,902,532 which is incorporated herein by reference. For example, this patent discloses a negative paste containing about 80% by weight PbO and about 17% by weight elemental Pb particles. However, the present invention shall not be restricted to these numerical values or any particular amounts and combinations of ingredients unless otherwise noted herein.

The negative paste 60 also includes a paste vehicle which is primarily used as a carrier medium to produce the completed paste 60. Water is a representative and preferred material suitable for use as the paste vehicle. Further information regarding representative amounts of the paste vehicle to be used in the claimed invention will be discussed below although, from a general standpoint, a representative negative paste 60 will typically include about 3–25% by weight vehicle therein.

In addition, the negative paste 60 may likewise contain an aqueous solution of $H_2SO_4$ therein (e.g. about 0.01–18 M) as an optional ingredient if needed as determined by preliminary pilot testing on the paste compositions and formulations under consideration. The $H_2SO_4$ will be used in situations where greater paste porosity is desired in, for example, "starting-lighting-ignition" (e.g. "SLI") applications. However, the present invention shall not be restricted to the use of $H_2SO_4$ in the negative paste 60 or any particular amounts/concentrations of this material.

If needed as determined by preliminary investigation, the negative paste 60 may also include an optional "expander" which is designed to promote paste uniformity and consistency, as well as long term or "cycling" performance. Representative materials suitable for this purpose include barium sulfate, carbon black, and lignosulfonate (which basically consists of a non-water-soluble mononuclear phenylpropane derivative) as described in U.S. Pat. No. 4,902,532. Further information regarding the amount of this material which may be employed in the negative paste 60 will be presented below.

As previously discussed, the present invention involves the use of a specialized paste additive in at least one of the positive paste 54, the negative paste 60, or both pastes 54, 60. This additive (which provides numerous important benefits in the completed battery 10) again involves polyvinylsulfonic acid or a salt thereof (e.g. a polyvinylsulfonate). All of the information presented above regarding the use of these materials in the positive paste 54 (including commercial sources, molecular weights, structural formula information, and the like) is equally applicable to the addition thereof to the negative paste 60. Likewise, the use of polyvinylsulfonic acid or polyvinylsulfonates in the negative paste 60 provides substantially the same benefits previously discussed in connection with the positive paste 54 including: (1) the ability of these materials to function as "plasticizers" in which the sulfate groups therein effectively interlink particulate materials (e.g. the lead-containing compositions) in the pastes to produce a more cohesive paste product; (2) an improvement in the overall charge capacity of the battery; (3) an increase in battery cycle life; (4) the production of more homogeneous, smooth, and uniform paste products which improves the overall efficiency of the paste application process; (5) the control of extraneous crystal growth on the plates; and (6) a general improvement in plate performance under normal and adverse (e.g. low temperature) operating conditions.

While the exact chemical and physical basis for the benefits provided by the use of polyvinylsulfonic acid/polyvinylsulfonates in the negative paste 60 are not completely understood, it is again believed that some or all of these benefits result from (A) the presence of sulfate ions in the claimed additive compositions; and (B) the high-molecular-weight polymeric character of polyvinylsulfonic acid/polyvinylsulfonates, with these materials being inherently stable. For example, the additive functions as a "plasticizer" in the negative paste 60. As noted above, the sulfate groups therein effectively interlink particulate materials (e.g. the lead-containing compositions) in the paste 60 to produce a more cohesive paste product. Sulfate groups in the polyvinylsulfonic acid/polyvinylsulfonate additive also appear to function as "substitutes" for sulfate groups in $H_2SO_4$ electrolyte materials. This substitution capability provides additional increases in battery capacity. Furthermore, the claimed additive is substantially immobile within the negative paste 60 and may also function as a "crystal growth modifier" during charging and discharging of the battery 10 as discussed above.

Finally, use of the claimed additive in the negative paste 60 generally improves the consistency of the paste 60. When added to the negative paste 60, the additive functions as a "rheology modifier" which makes the paste 60 smoother and more adhesive, thereby facilitating the paste application process.

The completed negative paste 60 will have a typical density of about 3–5 g/cc. A preferred negative paste 60 containing the desired additive composition is summarized below in Table II:

TABLE II

| Ingredient | Amount (% by weight) |
| --- | --- |
| Particulate lead-containing composition (e.g. $Pb_3O_4$) | about 70–95 |
| Paste additive (e.g. polyvinylsulfonic acid or a selected polyvinylsulfonate) | about 0.001–0.5 |
| Acid composition (e.g. $H_2SO_4$) | about 0–5 |
| Expander (e.g. barium sulfate) | about 0–5 |
| Paste vehicle (e.g. water) | balance (amount needed to make 100%) 100% |

The information in Table II is presented for example purposes only and shall not limit the invention in any respect. In addition, the claimed additive can be absent from the negative paste 60 and only present in the positive paste 54 as previously noted. The negative paste 60 without the additive will have the following preferred composition values: (1) Particulate lead-containing composition: about 70–95% by weight; (2) $H_2SO_4$: about 0–5% by weight; (3) Expander: about 0–5% by weight; and (4) Paste vehicle (water): balance needed to make 100%.

In conclusion, the present invention provides numerous important benefits compared with conventional battery systems. These benefits range from improved charge capacity to prolonged cycle life and greater chemical stability. For the many reasons listed above, the claimed invention represents a substantial advance in electrochemical cell technology which satisfies a number of long-felt needs in many different areas ranging from "starting-lighting-ignition" uses to "deep cycle" applications. Having herein set forth preferred embodiments of the invention, it is anticipated that suitable modifications may be made thereto by individuals skilled in the art which nonetheless remain within the scope of the invention. For example, unless otherwise indicated, the invention shall not be limited to any particular types of lead-acid electrochemical batteries, any structural designs associated with the plates in the batteries, and any other materials used in the batteries of interest including the electrolytes, separators, and the like. In this regard, the present invention shall only be construed in accordance with the following claims:

The invention that is claimed is:

1. A paste for use in a lead-acid electrochemical cell comprising:

at least one lead-containing composition;

a paste vehicle;

an expander composition; and a paste additive selected from the group consisting of polyvinylsulfonic acid and salts thereof.

2. The paste of claim 1 wherein said expander composition is selected from the group consisting of barium sulfate, carbon black, and lignosulfonate.

3. The paste of claim 1 wherein said paste comprises up to about 5% by weight said expander composition.

4. The paste of claim 1 wherein said lead-containing composition is selected from the group consisting of elemental Pb, $Pb_3O_4$, PbO, $PbSO_4$. and mixtures thereof.

5. The paste of claim 1 wherein said paste comprises about 70–95% by weight said lead-containing composition.

6. The paste of claim 1 wherein said paste further comprises $H_2SO_4$ therein.

7. A lead-acid electrochemical cell comprising:

a cell housing;

an electrically-conductive positive current collecting member within said housing, said positive current collecting member comprising a positive paste positioned thereon, said positive paste comprising at least one lead-containing composition, a paste vehicle, and a paste additive selected from the group consisting of polyvinylsulfonic acid and salts thereof; and an electrically-conductive negative current collecting member within said housing, said negative current collecting member comprising a negative paste positioned thereon, said negative paste comprising at least one lead-containing composition, a paste vehicle, and an expander composition.

8. The electrochemical cell of claim 7 wherein said expander composition in said negative paste is selected from the group consisting of barium sulfate, carbon black, and lignosulfonate.

9. The electrochemical cell of claim 7 wherein said negative paste comprises up to about 5% by weight said expander composition.

10. The electrochemical cell of claim 7 wherein said positive paste comprises about 0.001–0.5% by weight said paste additive.

11. The electrochemical cell of claim 7 wherein said positive current collecting member and said negative current collecting member are spirally-wound together with a separator member therebetween to form a spirally-wound cell unit.

12. The electrochemical cell of claim 7 wherein said negative paste further comprises a paste additive therein selected from the group consisting of polyvinylsulfonic acid and salts thereof.

13. A lead-acid electrochemical cell comprising:

a cell housing;

an electrically-conductive positive current collecting member within said housing, said positive current collecting member comprising a positive paste positioned thereon, said positive paste comprising at least one lead-containing composition and a paste vehicle; and an electrically-conductive negative current collecting member within said housing, said negative current collecting member comprising a negative paste positioned thereon, said negative paste comprising at least one lead-containing composition, a paste vehicle, an expander composition, and a paste additive selected from the group consisting of polyvinylsulfonic acid and salts thereof.

14. The electrochemical cell of claim 13 wherein said expander composition in said negative paste is selected from the group consisting of barium sulfate, carbon black, and lignosulfonate.

15. The electrochemical cell of claim 13 wherein said negative paste comprises up to about 5% by weight said expander composition.

16. The electrochemical cell of claim 13 wherein said negative paste comprises about 0.001–0.5% by weight said paste additive.

17. The electrochemical cell of claim 13 wherein said positive current collecting member and said negative current collecting member are spirally-wound together with a separator member therebetween to form a spirally-wound cell unit.

18. A plate structure for use in a lead-acid electrochemical cell comprising:
   an electrically-conductive current collecting member; and
   a paste positioned on said current collecting member, said paste comprising:
      at least one lead-containing composition;
      a paste vehicle;
      an expander composition; and
      a paste additive selected from the group consisting of polyvinylsulfonic acid and salts thereof.

19. A method for producing a plate structure for use in a lead-acid electrochemical cell comprising the steps of:
   providing an electrically-conductive current collecting member; and
   applying a paste to said current collecting member, said paste comprising:
      at least one lead-containing composition;
      a paste vehicle;
      an expander composition; and
      a paste additive selected from the group consisting of polyvinylsulfonic acid and salts thereof.

* * * * *